United States Patent [19]
Yumiyama et al.

[11] 3,727,580
[45] Apr. 17, 1973

[54] APPARATUS FOR REARING SILKWORMS

[75] Inventors: Seisuke Yumiyama, Ibaraki; Yoshitsugu Kinoshita, Kobe; Tadashi Kusunoki, Nishinomiya; Toshihiko Okada; Susumu Shimizu, both of Ayabe, all of Japan

[73] Assignees: Ganze Limited; Takeda Chemical Industries, Ltd.

[22] Filed: Oct. 7, 1971

[21] Appl. No.: 187,452

[30] Foreign Application Priority Data

Oct. 13, 1970 Japan..............................45/90248

[52] U.S. Cl.................................................119/6
[51] Int. Cl............................................A01k 67/04
[58] Field of Search.....................................119/6

[56] References Cited

UNITED STATES PATENTS 1,816,368 7/1931 Fioruzzi................................119/6

Primary Examiner—Louis G. Mancene
Assistant Examiner—J. A. Oliff
Attorney—Roberts B. Larson et al.

[57] ABSTRACT

An apparatus for rearing silkworms comprising, a first elevator conveyor having a multiplicity of supports for carrying rearing units in such manner that the rearing units can be pushed out from one side of the conveyor toward the other side, each of the rearing units being composed of a feeding tray and a net superposed on the feeding tray, a rearing frame having a multiplicity of shelves each having one end to be connected to the discharge end of each of the shelves on the conveyor, a second elevator conveyor having a multiplicity of shelves each having one end to be connected to the other end of each of the shelves on the rearing frame, a rearing unit loader provided for the first elevator conveyor, a rearing unit pusher provided for the first elevator conveyor, a rearing unit unloader provided for the second elevator conveyor, a conveyor connected to the rearing unit loader for supplying fresh feeding trays, a conveyor connected to the rearing unit unloader for discharging old feeding trays, and a carriage connecting the first elevator conveyor to the second elevator conveyor for receiving the net separated from the feeding tray, permitting the feeding tray to be delivered onto the discharge conveyor, and returning the net alone to the first elevator conveyor.

8 Claims, 16 Drawing Figures

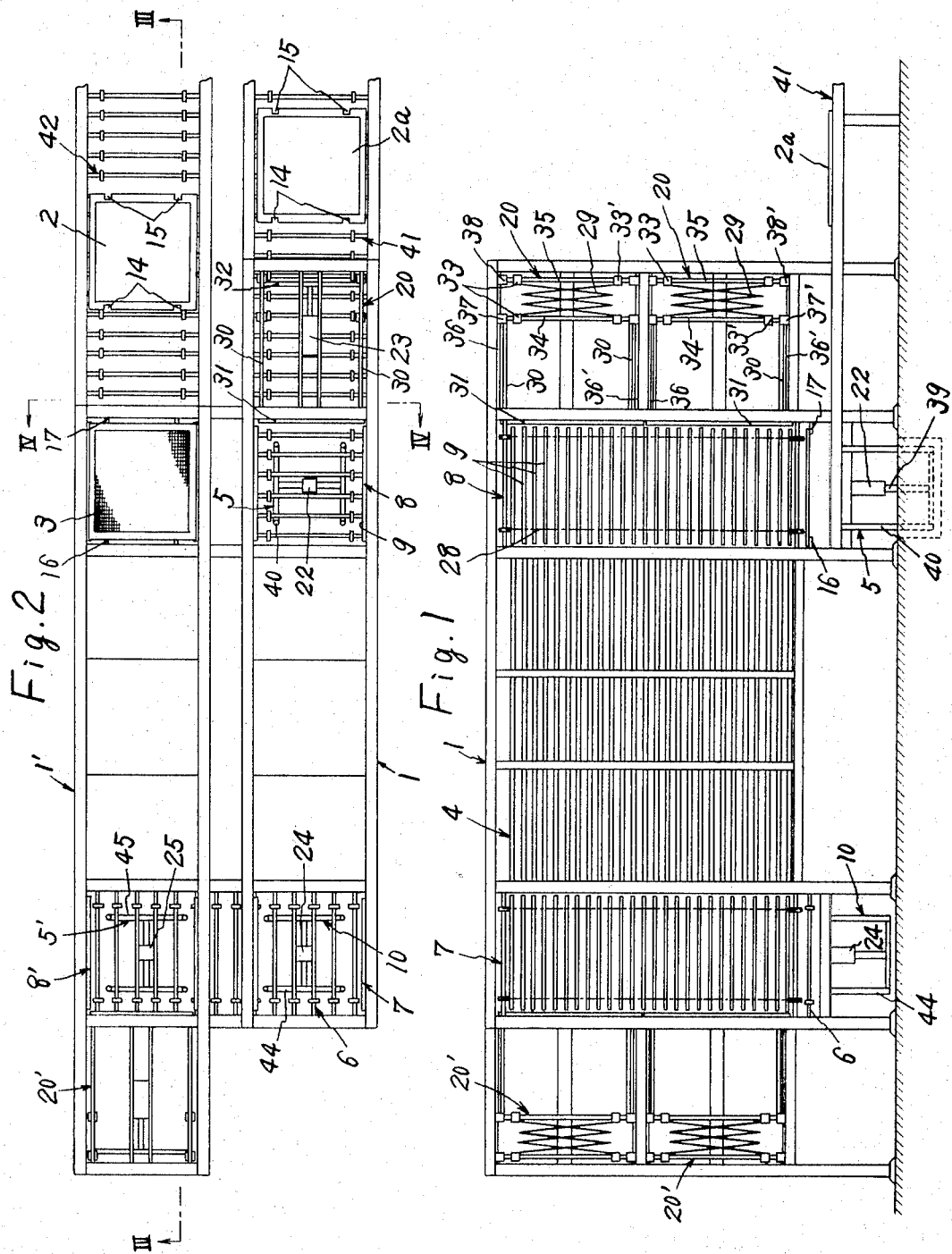

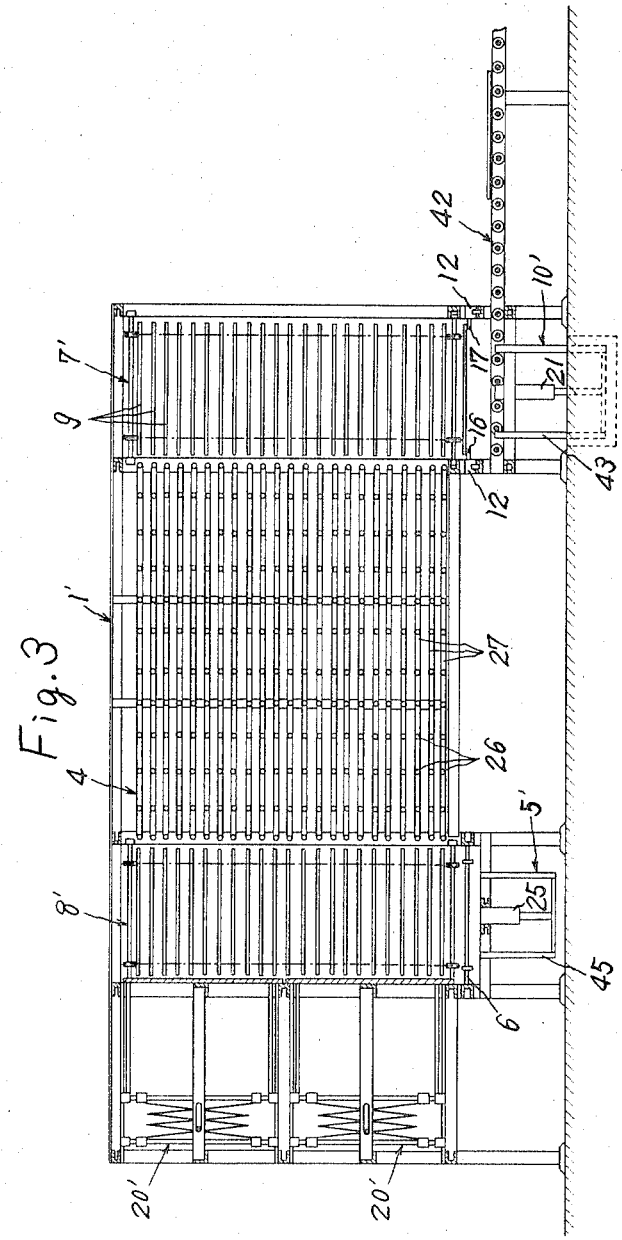

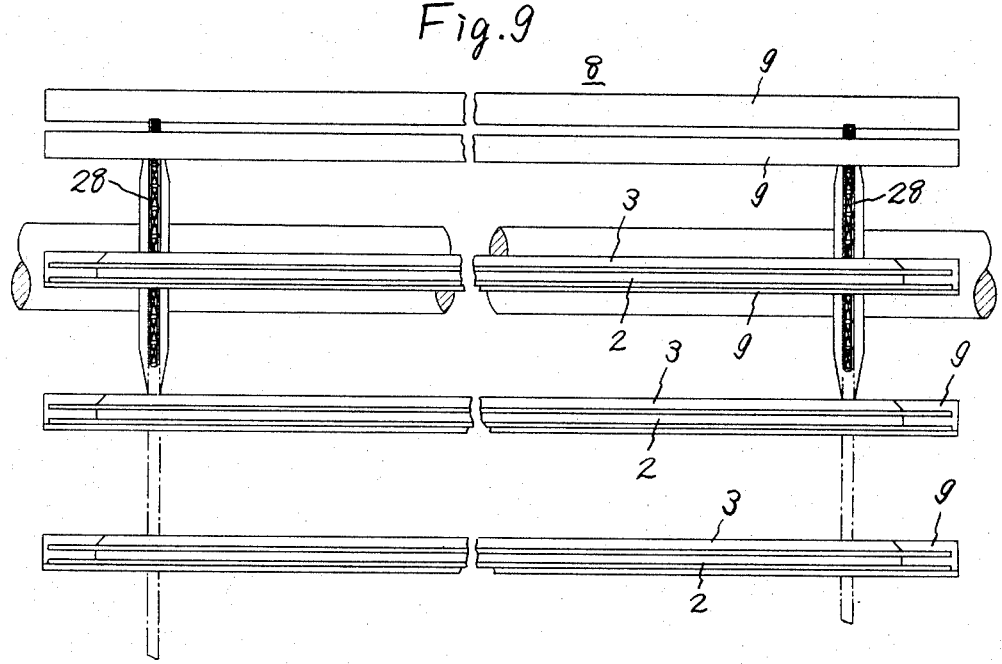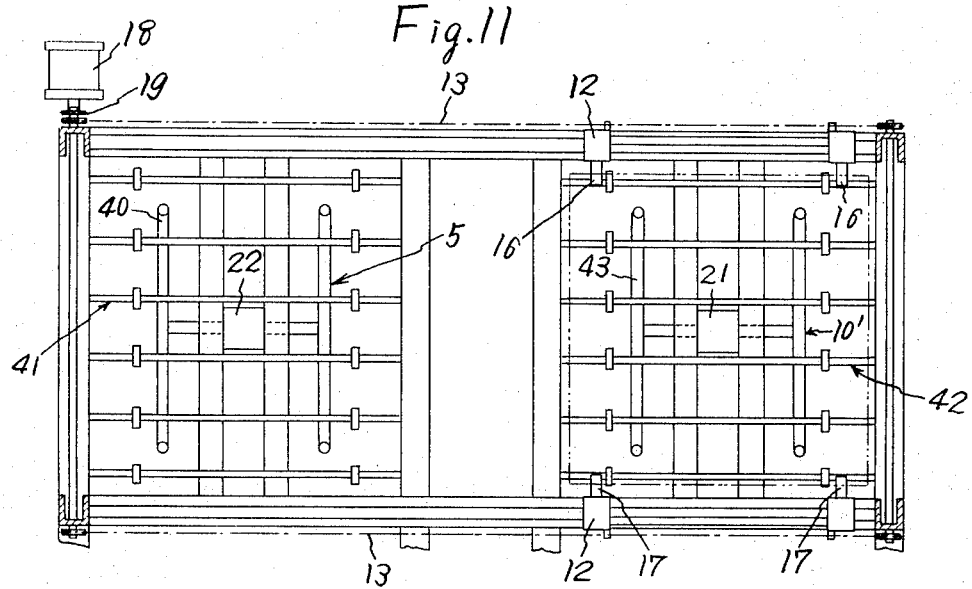

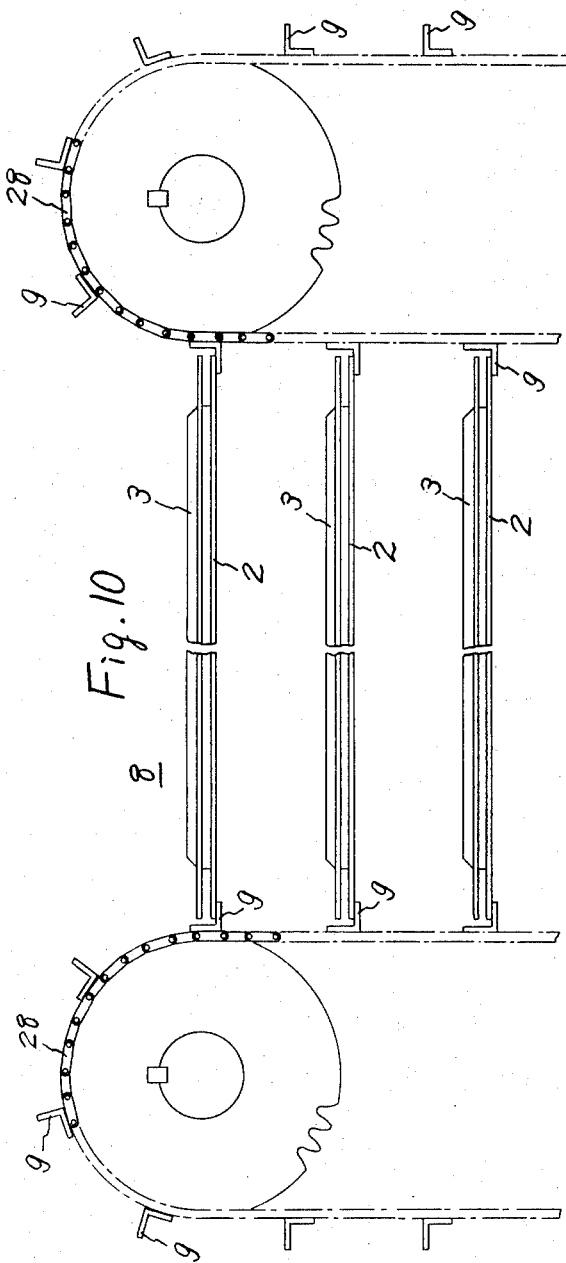

APPARATUS FOR REARING SILKWORMS

The present invention relates to an apparatus for rearing silkworms.

It is well known in sericulture that the rearing of silkworms is concerned, to a major extent, with feeding and removal of leftovers and garbages. In raising silkworms, these works have heretofore been performed by the hand with low efficiency and much labor. Such method is therefore not suitable for rearing a great number of silkworms. Moreover, the rearing of silkworms by the hand labor is undesirable from the viewpoint of disinfection, because silkworms are prone to infection with germs and man is most likely to bring germs into the rearing house.

An object of this invention is to provide an apparatus for rearing silkworms wherein feeding trays containing a fresh feed are automatically supplied to the worms and feeding trays already served are automatically sent out, the apparatus thus being capable of rearing worms efficiently without hand labor and keeping the apparatus disinfected against germs to be otherwise brought in with the human body.

Another object of this invention is to provide an apparatus for rearing silkworms wherein the above-mentioned automatic supply of fresh feeding trays and automatic discharge of old feeding trays can be effected without waste of time but with high mechanical efficiency. The present invention provides an apparatus comprising:

a first elevator conveyor having a multiplicity of shelves for carrying rearing units in such manner that the rearing units can be pushed out from one side of the conveyor toward the other side, each of the rearing units being composed of a feeding tray and a net superposed on the feeding tray and having such meshes as to permit the silkworm to eat the feed on the feeding tray and to stay on the net, a rearing frame having a multiplicity of shelves each having one end to be connected to the discharge end of each of the shelves on the conveyor so as to receive the rearing units pushed out from the conveyor, a second elevator conveyor having a multiplicity of shelves each having one end to be connected to the other end of each of the shelves on the rearing frame so as to receive the rearing units pushed out from the rearing frame, a rearing unit loader provided for the first elevator conveyor, a rearing unit pusher provided for the first elevator conveyor, a rearing unit unloader provided for the second elevator conveyor, a conveyor connected to the rearing unit loader for supplying fresh feeding trays, a conveyor connected to the rearing unit unloader for discharging old feeding trays, and a carriage connecting the second elevator conveyor to the first elevator conveyor for receiving the net separated from the feeding tray, permitting the feeding tray to be delivered onto the discharge conveyor, and returning the net alone to the first elevator conveyor.

In accordance with this invention, the first elevator conveyor connected to the rearing frame is provided with a rearing unit loader, which is further connected to the feeding tray supplying conveyor. Thus, the feeding trays can be automatically loaded onto the shelves of the first elevator conveyor by the supply conveyor and the loader. The operation of the first elevator conveyor brings the shelves thereon to the position of the loader one after another. In accordance with this invention, the elevator conveyor may preferably be driven intermittently in order to facilitate the control on the timing of loading of the feeding trays by the loader. In this case, the amount of the intermittent movement between intervals corresponds to the pitch of the superposed shelves on the elevator conveyor. The loading of the feeding tray by the loader is conducted every time each of the shelves on the first elevator conveyor is brought to the position of the loader, whereby the feeding trays are automatically placed onto the shelves of the first elevator conveyor one after another.

The second elevator conveyor connected to the rearing frame is provided with the rearing unit unloader, by which the rearing units on the shelves of the second elevator conveyor are automatically unloaded from the shelves. Each of the shelves on the second elevator conveyor is brought to the position of the unloader by the operation of the conveyor. The second elevator conveyor may preferably be driven intermittently like the first elevator conveyor. The amount of movement of the second conveyor between the intervals is also equal to the pitch of the superposed shelves. Every time each of the shelves is brought to the position of the unloader, the rearing unit thereon is unloaded by the unloader automatically and in succession.

The second elevator conveyor is connected to the first elevator conveyor by the carriage. In unloading the rearing unit, the carriage is kept standing by at the position of the unloader, and the net of the rearing unit is delivered onto the carriage. The carriage is provided with means for receiving the net upon separation from the feeding tray. The feeding tray separated from the net is subsequently carried down by the unloader onto the discharge conveyor and is sent out of the apparatus.

The net thus seated on the carriage upon separation from the tray is carried forward for the subsequent loading onto the first elevator conveyor by the loader. After the net has been moved forward, the aforementioned fresh feeding tray is sent in, whereby the net is automatically superposed on the fresh feeding tray and the unit is supplied to the shelf on the first elevator conveyor.

In accordance with this invention, the first elevator conveyor is unloaded and the second elevator conveyor is loaded with rearing units on the respective shelves, and the operations described above are then conducted. In this way, fresh feeding trays are automatically supplied to the silkworms on the net and, at the same time, old feeding trays already served are automatically taken out of the apparatus.

The first elevator conveyor is provided with the rearing unit pusher. Each of the shelves of the elevator conveyor has an end from which the rearing unit is pushed out and which is to be connected to each of the shelves on the rearing frame, the arrangement being such that the rearing units are pushed out from the shelves of the first elevator conveyor onto the shelves of the rearing frame by the pusher. The pushing action not only forces the rearing units from the elevator conveyor to the rearing frame, but also transfers the rearing units already placed on the shelves of the rearing frame from these shelves onto the shelves on the second elevator conveyor, since the pushing-out ends of the former are connected to the latter. For this transference, the second elevator conveyor has previously been unloaded. Thus, the transference of the rearing units from the shelves on the first elevator conveyor to the subsequent shelves on the rearing frame, as well as the transference of the rearing units from the rearing frame to the shelves on the second elevator conveyor, is carried out automatically.

In accordance with this invention, a row of the rearing frame, first elevator conveyor and second elevator conveyor may be used alone, or two or more rows of these may be used side by side.

In the case where a plurality of the rearing frames are employed, the rearing units are loaded onto the shelves of each of the first elevator conveyor and pushed out therefrom by the loader and the pusher provided for the first elevator conveyor for each of the rearing frames. In this type of embodiment, the second elevator conveyor for each rearing frame is connected to the first elevator conveyor for the subsequently arranged rearing frame by the transfer conveyor, by which the rearing units are transferred from the former to the latter. The rearing units are loaded onto the first elevator conveyor by the loader provided therefor. The second elevator conveyor for the last rearing frame is connected to the first elevator conveyor for the first rearing frame by a carriage. A fresh feeding tray supply conveyor is connected to the loader provided for the first conveyor for the first rearing frame, and an old feeding tray discharge conveyor is connected to the unloader provided for the second elevator conveyor for the last rearing frame.

It will be apparent from the foregoing description that the rearing nets are carried forward in circulation for a series of operations of:

Supply of feeding fresh trays → Silkworm rearing (in rearing frame) → Discharge of old feeding trays → Supply of fresh feeding trays.

As already described, the supply of fresh feeding trays and discharge of the old feeding trays can be conducted automatically without employing hand labor. In addition, a cycle of operations of supply of feeding fresh trays → silkworm rearing (in rearing frame) → discharge of old feeding trays → supply of fresh feeding trays is performed automatically with high efficiency without using hand labor. The invention has a further advantage that the rearing house can be free of infection with germs to be brought in with the human body.

Because the automatic supply of the fresh feeding trays and automatic discharge of the old feeding trays are performed at the same time, and because the recovery of the rearing nets from the old feeding tray discharging process to the fresh feeding tray supply process is conducted during the period that the silkworms on the nets on shelves of the rearing frame consume the feed in the underlying trays, the automatic supply of the fresh trays and automatic discharge of the old trays can be effected without waste of time to achieve high mechanical efficiency.

In accordance with this invention, the silkworms are reared on a net and carried on the net as it is circulated through the foregoing processes. The net has such meshes as to permit the silkworm to eat the feed on the feeding tray through the meshes and to stay on the net. In order to enable the silkworm to eat the feed, the smallest mesh size may be such as to permit the mouth of the silkworm to pass through the meshes. Although the silkworm will stay on a net of greater meshes and is least likely to drop through the meshes since the worm has the habit of crawling on anything it comes into contact with, it is preferable to use a net of a mesh size smaller than the length of the worm. Most preferably, the meshes are smaller than the length of the silkworm but large enough for the worm to pass through as desired. Since the silkworms inherently stay at the place of the feed, it is not particularly necessary to provide the net on the tray with an enclosure for keeping them in. A very simple enclosure will serve the purpose, if such means is to be provided.

The apparatus of this invention is particularly suitable for the rearing of a great number of silkworms, because of the foregoing construction and because the rearing frame, first elevator conveyor and second elevator conveyor have a multiplicity of shelves.

For a better understanding of this invention, preferred embodiments of this invention will be described below with reference to the accompanying drawings.

FIG. 1 is a schematic side elevation showing an embodiment of apparatus of this invention;

FIG. 2 is a plan view of FIG. 1;

FIG. 3 is a view in section taken along the line III — III in FIG. 2;

FIG. 9 is an enlarged side elevation showing part of an elevator conveyor in the above-mentioned embodiment;

FIG. 10 is a front view of FIG. 9;

FIG. 11 is an enlarged plan view showing a carriage, a rearing unit loader and a rearing unit unloader of the above embodiment;

Figure 4:
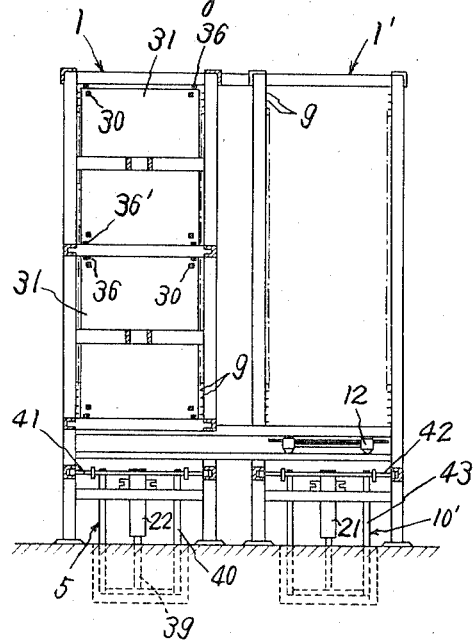
FIG. 4 is a view in section taken along the line IV — IV in FIG. 2.
Figure 5:
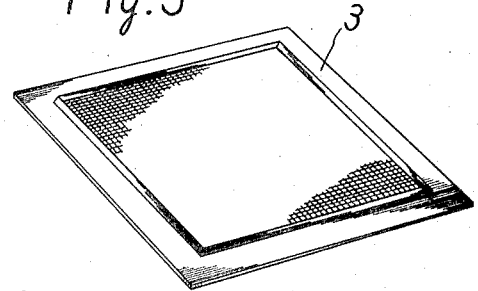
FIG. 5 is a perspective view showing a rearing net used in the embodiment of FIG. 1.
Figure 6:
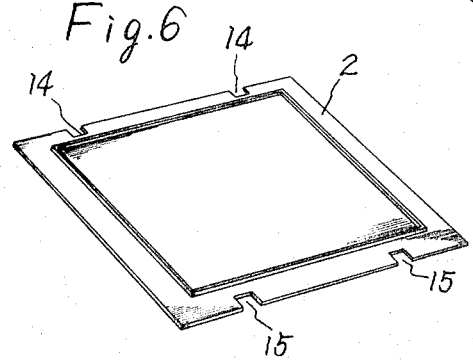
FIG. 6 is a perspective view of a feeding tray used in the embodiment of FIG. 1.
Figure 7:
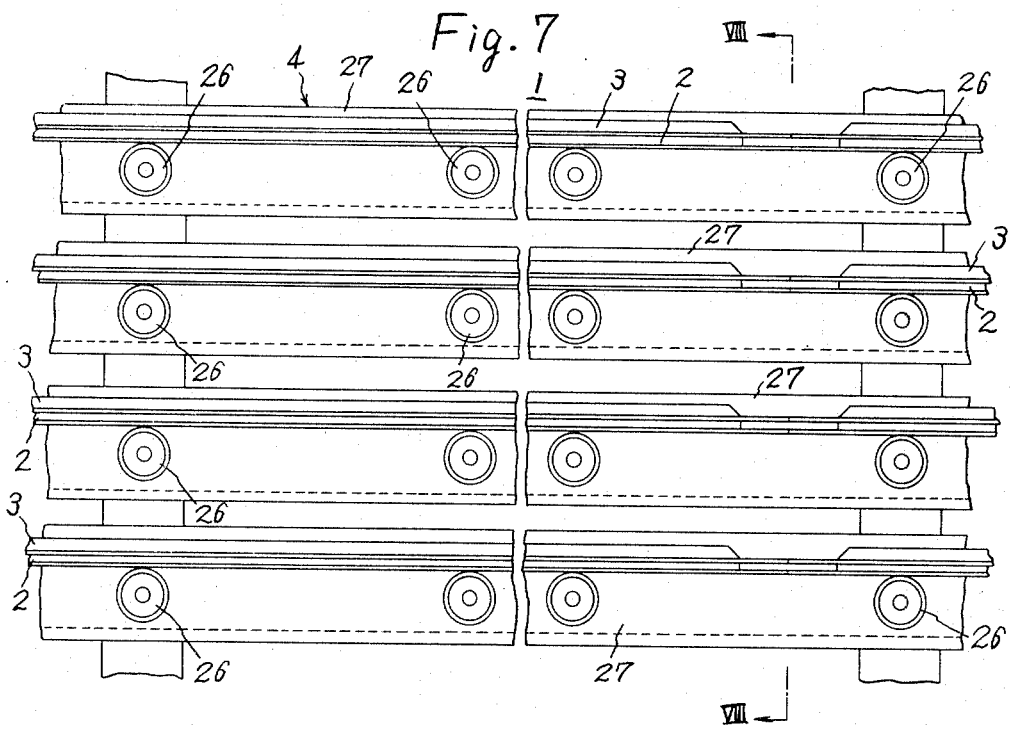
FIG. 7 is an enlarged side elevation showing part of shelves in a rearing frame of the embodiment of FIG. 1.
Figure 8:
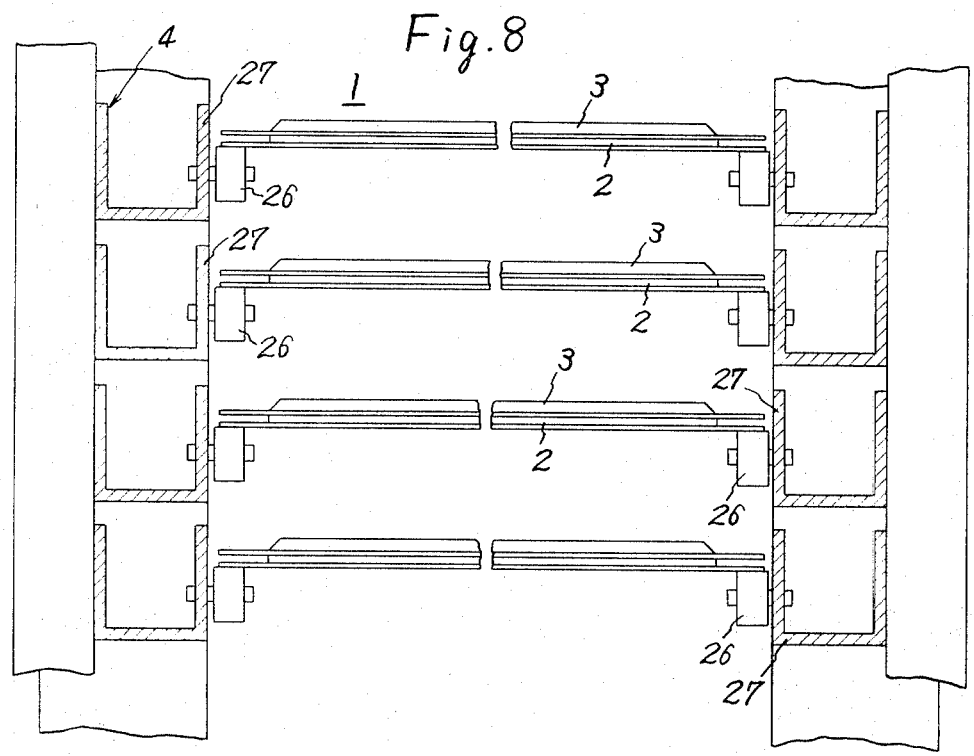
FIG. 8 is a view in section taken along the line VIII — VIII in FIG. 7.
Figure 12:
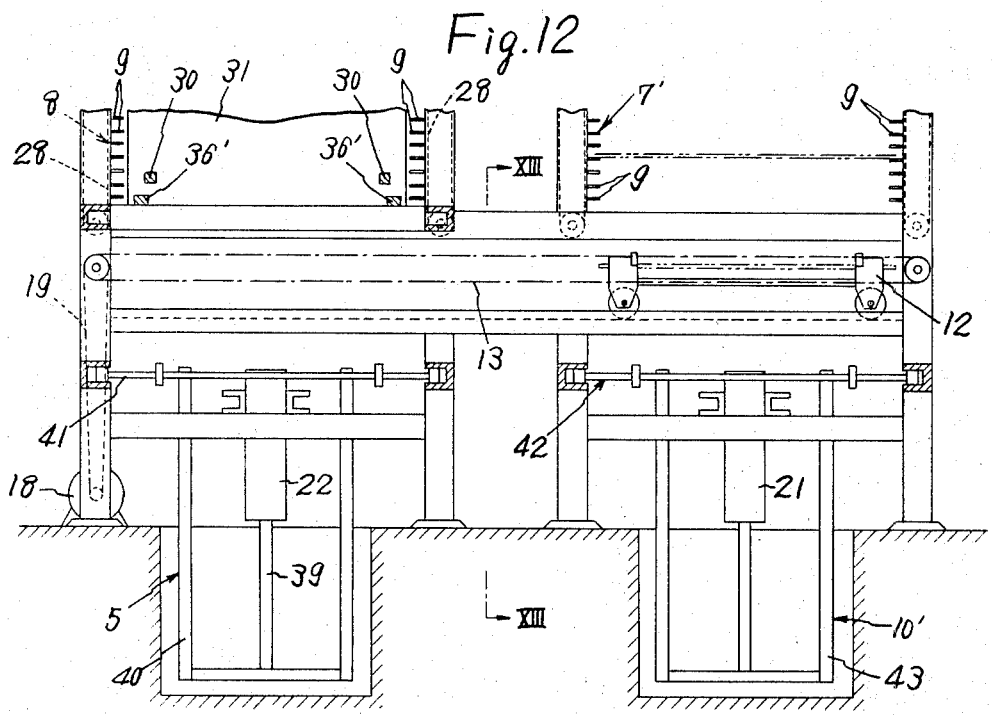
FIG. 12 is a front view of FIG. 11.
Figure 13:
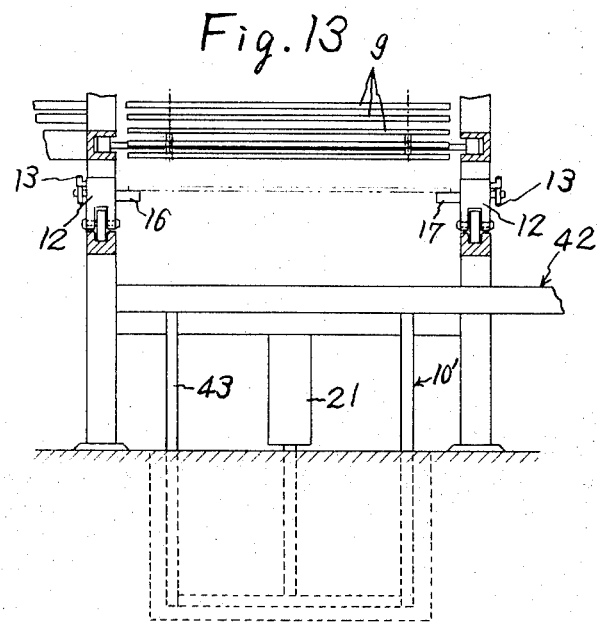
FIG. 13 is a view in section taken along the line XIII — XIII in FIG. 12.

FIGS. 1 to 4 show an embodiment of the type which includes rearing frames, first elevator conveyors and second elevator conveyors arranged in two rows. Each of silkworm rearing frames 1, 1' has a multiplicity of shelves 4, each carrying rearing units of a feeding tray 2 (see FIG. 6) and a net 3 (see FIG. 5) superposed on the tray 2. The rearing units are adapted to be pushed in at one end of the frame so as to be forced out from the other end. In the present embodiment, each shelf 4 comprises horizontal members 27 provided with rollers 26 at the same level (see FIGS. 7 and 8). From the viewpoint of commercial production, the rearing frame may preferably be of such length that at least two rearing units can be placed thereon in series. In the illustrated embodiment, three units are disposed side by side. The shelf 4 may be lengthened by conventional means such as welding or bolt and nut connection. At the right end of the rearing frame 1 on this side as seen in FIG. 1 (hereinafter referred to a "first rearing frame"), there is provided a first elevator conveyor 8, and installed at the left end thereof is a second elevator conveyor 7. Disposed in the rear of the first rearing frame 1 is a rearing frame 1' (herein referred to as a "second rearing frame") having another first elevator conveyor 8' at its left end and another second elevator conveyor 7' at its right end. The first elevator conveyor 8 comprises a number of lateral supports 9 fixed to endless means 28 such as chains, wire rope or the like and vertically spaced in parallel by a distance corresponding to the vertical distance between the rollers 26 on the adjacent shelves 4, the endless chains 28 being spaced apart by a suitable distance transversely of the rearing frame 1. The other three elevator conveyors are of the same construction as the first elevator conveyor 8. The first elevator conveyors 8, 8' for the first and second rearing frames 1, 1' are driven in such direction that the lateral supports 9 on the inner side thereof are moved upward. The second elevator conveyors 7, 7' are driven in the reverse direction to lower the lateral supports.

Figure 14:
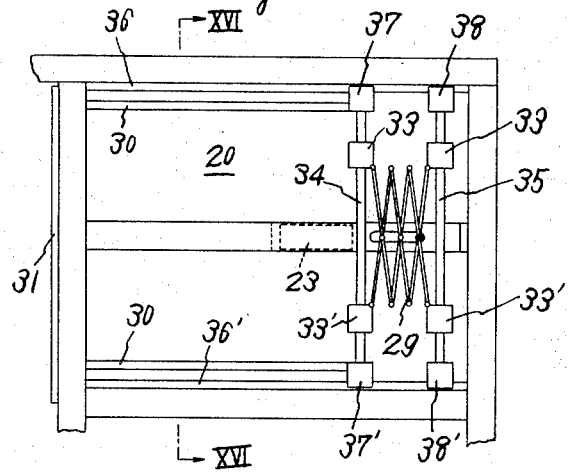
FIG. 14 is an enlarged side elevation showing a rearing unit pusher of the embodiment.
Figure 15:
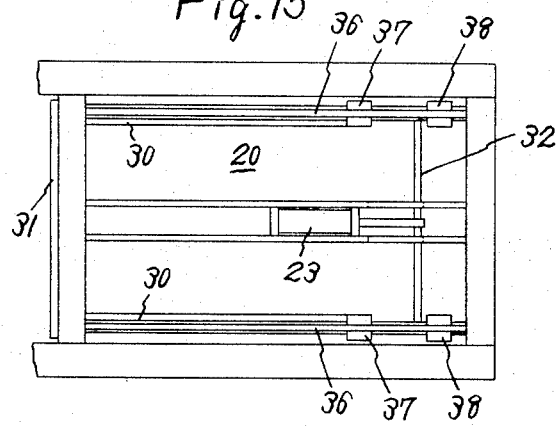
FIG. 15 is a plan view of FIG. 14.
Figure 16:
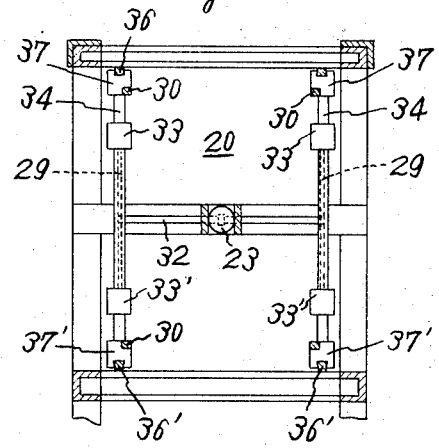
FIG. 16 is a view in section taken along the line XVI — XVI in FIG. 14.

The first elevator conveyors 8, 8' are equipped with rearing unit pushers 20, 20' and rearing unit loaders 5, 5'. The second elevator conveyors 7, 7' are provided with rearing unit unloaders 10, 10'. The rearing unit pusher 20 comprises suitable drive means 23 such as a hydraulic cylinder, extendible link means 29 to be extended by the drive means 23, and a pushing plate 31 connected to the link means 29 by connecting rods 30 (see FIGS. 14 to 16). The pushing plate 31 has a width smaller than the distance between the opposing lateral supports 9, 9 on the elevator conveyor 8. The extendible links included in the link means 29 are disposed on the opposite sides of the hydraulic cylinder 23 and interconnected by a link 32. Each of the extendible links has two pairs of upper and lower slide shoes 33, 33' in the front and rear. The slide shoes 33, 33' in front are slidably mounted on a guide rod 34 and the slide shoes 33, 33' in the rear, on a guide rod 35. The front guide rod 34 is connected to the connecting rods 30 by other slide shoes 37, 37' slidable on upper and lower guide rails 36, 36'. The rear guide rod 35 is joined with stationary members 38, 38'. The illustrated embodiment further includes two pushers 20 which are arranged one on top of the other. However, if the drive means 23 has such output that all the layers of the rearing units of feeding trays 2 and nets 3 on the elevator conveyor 8 can be pushed forward, only one pusher 20 will then be employed with satisfactory results. Another pusher 20' has the same construction as the above pusher 20. On the other hand, the rearing unit loader 5 comprises suitable drive means 22 such as hydraulic cylinder or the like, a plunger 39 to be vertically moved by the drive means 22, and a receiving frame 40 fixed to the distal end of the plunger 39. Another rearing unit loader 5' and the rearing unit unloaders 10, 10' also have the same construction as the loader 5.

The loader 5 provided for the first elevator conveyor 8 for the first rearing frame 1 is connected to a conveyor 41 for supplying fresh feeding trays. The unloader 10' provided for the second elevator conveyor 7' for the second rearing frame 1' is connected to conveyor 42 for discharging old feeding trays. The second elevator conveyor 7 for the first rearing frame 1 is connected to the first elevator conveyor 8' for the second rearing frame 1' by a rearing unit transfer conveyor 6. The supply conveyor 41 illustrated is a roller conveyor which is driven by suitable transmission means (not shown) such as a chain drive system. The discharge conveyor 42 and the transfer conveyor 6 are identical with the supply conveyor 41 in construction.

A carriage 12 connects the first elevator conveyor 8 for the first rearing frame 1 to the second elevator conveyor 7' for the second rearing frame 1'. The carriage 12 is in a suitable form such as a frame which enables the feeding tray 2 to pass through the carriage up and down. The carriage 12 is mounted on reversibly driven endless chains 13 positioned between a plane defined by the under face of the elevator conveyor 7' and the under face of the elevator conveyor 8 and another plane defined by the upper faces of the supply conveyor 41 and the discharge conveyor 42. The endless chains 13 drive the carriage 12 back and forth between the elevator conveyors 7' and 8. The carriage 12 has dogs 16, 16, 17, 17 of such size that they are free to vertically pass through notches 14, 14, 15, 15 formed in the front and rear ends (i.e. left and right ends as seen in FIG. 1) of the feeding tray 2, the dogs being arranged in corresponding relation to the notches. The endless chains 13 of the carriage 12 are driven by a motor 18 through transmission means 19 such as chains.

In the apparatus shown in FIGS. 1 to 4, suppose that the rearing units of the feeding tray 2 and net 3 thereon are loaded on the rearing frame 1, second elevator conveyor 7 for the frame 1, second rearing frame 1' and the second elevator conveyor 7' for the frame 1' to the full extent, with the elevator conveyors 8, 8' unloaded. In this state, the elevator conveyor 7' is moved down intermittently a distance corresponding to the pitch of the superposed lateral supports 9 by intermittently driving means (not shown). Further with the same cycle as the intermittent movement of the elevator conveyor 7', the carriage 12 is reciprocally travelled between the under surface of the elevator conveyor 7' and the under surface of the elevator conveyor 8 by means of the motor 18 through the chain 19. During the movement of the elevator conveyor 7', the carriage 12 stays under the elevator conveyor 7' and the receiving frame 43 of the unloader 10' below the elevator conveyor 7' stands by at an elevated position at the same time. Accordingly, as the elevator conveyor 7' is lowered, the rearing unit on the lowermost shelf on the conveyor 7' is delivered onto the receiving frame 43. Upon receiving the rearing unit, the receiving frame 43 starts to move down. Designated at 21 is a driving means for the receiving frame 43. The timing of the downward movement of the receiving frame 43 may be controlled by suitable means such as a limit switch (not shown). Other operations of this apparatus to be described below will also be controlled by similar means in practice. The rearing unit on the descending frame 43 is then brought to the position of the carriage 12. Since the feeding tray 2 is formed in its front and rear edges with notches 14, 14, 15, 15 positioned in corresponding relation to the dogs 16, 16, 17, 17 on the carriage 12 and permitting the passage of the dogs, the feeding tray 2 alone is allowed to move further downward during the subsequent downward movement of the receiving frame 43, whereas the net 3 on the feeding tray 2 is caught on the dogs 16, 16, 17, 17 of the carriage 12 and retained thereon, with the result that the feeding tray 2 is separated from the net 3. The descending frame 43 then places the feeding tray on the discharge conveyor 42, and the tray is thereafter sent out of the apparatus. The net 3 transferred onto the carriage 12 is carried to the position below the under face of the elevator conveyor 8.

During the foregoing operation, a feeding tray 2a containing a fresh feed is brought, with a suitable timing, to under the elevator conveyor 8 by the supply conveyor 41 and is waiting in this position. The supply conveyor 41 comes to a halt when it has brought the fresh feeding tray 2a to the above-mentioned predetermined position. The travel of the carriage 12 toward the elevator conveyor 8 is followed by the elevation of the receiving frame 40 which is located at the position of the elevator conveyor 8, whereby the fresh feeding tray 2a is carried upward to come into contact with the net 3 on the carriage 12 and is further raised along with the net 3. When the unit of the fresh feeding tray 2a and the net 3 reaches a predetermined level, the unit is received by a pair of the lowermost opposing lateral supports 9, 9 on the elevator conveyor 8 which is moved upward in an equal relation to the elevator conveyor 7' in distance. In this way, unloading of the feeding tray 2 from the elevator conveyor 7', discharge of the same, transference of the net 3 from the elevator conveyor 7' to the elevator conveyor 8, supply of the fresh feeding tray 2a to the recovered nets 3 are further conducted repeatedly.

While the operations described above are performed, the rearing units on the shelves on the second elevator conveyor 7 in the first rearing frame are transferred therefrom to the first elevator conveyor 8' for the second rearing frame 1' one after another in the following manner. The second elevator conveyor 7 for the first rearing frame 1 is intermittently moved downward the same distance as the first elevator conveyor 8' for the second rearing frame 1', the latter conveyor 8' being intermittently moved upward an equal distance at a time. The rearing unit on the lowermost shelf on the conveyor 7 is brought down on the receiving frame 44 thereunder by the descending elevator conveyor 7, and the receiving frame 44 is then lowered by the hydraulic cylinder 24, together with the rearing unit on the frame 44 to place the unit on the transfer conveyor 6, which in turn carries the rearing unit to under the first conveyor 8' for the second rearing frame 1' and comes to a halt. The rearing unit is then brought up to the first elevator conveyor 8' by the receiving frame 45 of the loader 5' provided for the elevator conveyor 8'. The upward movement of the conveyor 8' enables the rearing unit to be loaded on the lowermost pair of the opposing lateral supports of the conveyor 8'. The receiving frame 45 of the loader 5' which has brought up the rearing unit is then lowered by the hydraulic cylinder 25 for the subsequent operation. Thus, in the same manner as above, the rearing units are transferred from the second elevator conveyor 7 for the first rearing frame 1 to the first elevator conveyor 8' for the second rearing frame 1' one after another.

After the transference of all the nets 3 from the elevator conveyor 7' to the elevator conveyor 8, supply of the fresh feeding trays to the recovered nets 3, transference of all the rearing units from the elevator conveyor 7 to the elevator conveyor 8' have been completed, the rearing unit pushers 20 and 20' are initiated into operation to push all layers of the rearing units on the elevator conveyor 8 on to the respective shelves of the first rearing frame 1 and to push all layers of the rearing units on the elevator conveyor 8' onto the shelves of the second rearing frame 1'. When the pushing operation is to be conducted, the rearing frames 1, 1' have already been fully loaded with the rearing units. Thus they are pushed forward by the pushing operation. To assure effective pushing, each of the feeding tray 2 may be formed at its front and rear ends with upwardly or downwardly projecting flanges (not shown). Since the elevator conveyors 7' and 7 are unloaded as will be apparent from the above, the rearing units can be loaded onto the elevator conveyors 7' and 7 by pushing.

Thus the silkworm rearing nets are carried forward in circulation for a series of operations of:
Supply of fresh feeding trays → Silkworm rearing → Discharge of old feeding trays → Supply of fresh feeding trays.

Another preferred type of embodiment of this invention may comprise a rearing frame, a first elevator conveyor and a second elevator conveyor arranged in a row. In this arrangement, the first elevator conveyor will be disposed at one end of the rearing frame, with the second elevator conveyor positioned at the other end thereof, and the conveyor 6 and pusher 20' included in the apparatus of FIGS. 1 to 16 will be omitted. In this type of apparatus, the carriage may be installed in a space under the rearing frame and reciprocated in the space.

The apparatus of this invention is generally used for rearing silkworms of fourth or fifth instars. If silkworms of fourth instars or younger are to be reared on the present apparatus, the rearing net in conformity with the growth will be used every time they molt.

In employing the apparatus of this invention, silkworms may be fed on natural feed such as mulberry leaves that have long been used widely or on various prepared diets. For example, the composition of a prepared diet is given below.

Composition of Prepared Diet

| Substance | Amount |
| --- | --- |
| Mulberry leaf powder | 20 g |
| Soybean protein (defatted) | 25 g |
| Starch | 15 g |
| Sucrose | 10 g |
| Cellulose power | 35 g |
| β-Sitosterol | 500 mg |
| Vitamin mixture | 500 mg |
| Wesson's mineral | 1000 mg |
| Ascorbic acid | 500 mg |
| Inositol | 500 mg |
| Potassium phosphate, dibasic | 500 mg |
| Choline chloride | 50 mg |
| Total | 108.55 g |
| Water | 160 ml |

The above composition is milled and then steamed at about 100 °C for 20 minutes to prepare a diet which is generally made into a strip of about 2 cm in width and 2 to 3 mm in thickness or into a rod with a diameter of about 4 to 8 mm.

By using the apparatus of this invention of the type illustrated and having 300 shelves, 240,000 silkworms of fifth instars were reared with use of 840 kg of the above diet. As a result, about 440 kg of cocoons were spun.

The silkworms are taken out of this apparatus for spinning in the following manner. The carriage 12 is stopped at the midway between the elevator conveyor 7' and 8. In this state empty feeding trays are supplied onto the elevator conveyor 8 by the supply conveyor 41 instead of transferring the nets 3 from the elevator conveyor 7' to the elevator conveyor 8. When the elevator conveyor 8 is fully loaded with the empty feeding trays, the trays are delivered to the rearing frame 1 by the pusher 20. On the other hand, the rearing units are taken out from the elevator conveyor 7' onto the conveyor 42 to discharge then from the apparatus. The rearing units to be subsequently carried to the elevator conveyor 7' are further taken out in the same manner.

What we claim is:

1. An apparatus for rearing silkworms comprising, a first elevator conveyor having a multiplicity of supports for carrying rearing units in such manner that the rearing units can be pushed out from one side of the conveyor toward the other side, each of the rearing units being composed of a feeding tray and a net superposed on the feeding tray and having such meshes as to permit the silkworm to eat the feed on the feeding tray and to stay on the net, a rearing frame having a multiplicity of shelves each having one end to be connected to the discharge end of each of the shelves on the conveyor for receiving the rearing units pushed out from the conveyor, a second elevator conveyor having a multiplicity of shelves each having one end to be connected to the other end of each of the shelves on the rearing frame for receiving the rearing units pushed out from the rearing frame, a rearing unit loader provided for the first elevator conveyor, a rearing unit pusher provided for the first elevator conveyor, a rearing unit unloader provided for the second elevator conveyor, a conveyor connected to the rearing unit loader for supplying fresh feeding trays, a conveyor connected to the rearing unit unloader for discharging old feeding trays, and a carriage connecting the first elevator conveyor to the second elevator conveyor for receiving the net separated from the feeding tray permitting the feeding tray to be delivered onto the discharge conveyor, and returning the net alone to the first elevator conveyor.

2. The apparatus as set forth in claim 1 wherein at least two rows of the rearing frames, the first elevator conveyors and the second elevator conveyors are arranged side by side, and the second elevator conveyor for each of the rearing frames is connected to the first elevator conveyor for the subsequently positioned rearing frame by a rearing unit transfer conveyor, the second elevator conveyor for the rearing frame in the last row being connected to the first elevator conveyor for the rearing frame in the first row by the carriage, the fresh feeding tray supply conveyor being connected to the loader provided for the first elevator conveyor in the first row, the old feeding tray discharge conveyor being connected to the unloader provided for the second elevator conveyor in the last row.

3. The apparatus as set forth in claim 2 wherein two rows of the rearing frames, first elevator conveyors and second elevator conveyors are provided.

4. The apparatus as set forth in claim 1 wherein the net has an extension substantially extending outward beyond the outer peripheral edge of the feeding tray, and the carriage has portions for engaging the extension.

5. The apparatus as set forth in cliam 1 wherein the feeding tray is formed in its opposing outer edges with notches, and the carriage is formed with dogs for supporting the net in corresponding relation to the notches.

6. The apparatus as set forth in claim 1 wherein each of the elevator conveyors comprises opposing endless means fixedly providing lateral supports spaced apart in parallel by a given pitch.

7. The apparatus as set forth in claim 4 wherein the carriage is formed in the shape of a frame for permitting the feeding tray to vertically pass through the space thereof.

8. The apparatus as set forth in claim 1 wherein each of the shelves on the rearing frame includes rollers.

* * * * *